(12) United States Patent
Bader et al.

(10) Patent No.: US 8,919,096 B2
(45) Date of Patent: Dec. 30, 2014

(54) SYSTEM FOR CONTROLLING A PLURALITY OF FUNCTIONS OF A TURBOJET ENGINE

(75) Inventors: Nicolas Alain Bader, Vaux le Penil (FR); Rachid Boudyaf, Alfortville (FR); Thomas Deguin, Toulouse (FR); Antoine Jean Baptiste Stutz, Madrid (ES)

(73) Assignee: Snecma, Paris (FR)

( * ) Notice: Subject to any disclaimer, the term of this patent is extended or adjusted under 35 U.S.C. 154(b) by 1095 days.

(21) Appl. No.: 12/867,835

(22) PCT Filed: Feb. 13, 2009

(86) PCT No.: PCT/FR2009/050230
§ 371 (c)(1),
(2), (4) Date: Oct. 21, 2010

(87) PCT Pub. No.: WO2009/101370
PCT Pub. Date: Aug. 20, 2009

(65) Prior Publication Data
US 2011/0048028 A1  Mar. 3, 2011

(30) Foreign Application Priority Data
Feb. 15, 2008  (FR) ...................... 08 50991

(51) Int. Cl.
*F02C 9/00* (2006.01)
*F02K 1/76* (2006.01)

(52) U.S. Cl.
CPC ............... *F02K 1/763* (2013.01); *Y02T 50/671* (2013.01); *F05D 2260/40* (2013.01)

USPC ............. 60/226.2; 60/793; 60/802; 60/226.3; 244/110 B; 239/265.19; 239/265.25

(58) Field of Classification Search
USPC .......... 60/226.1, 793, 226.2, 226.3, 778, 786, 60/788, 802; 701/100; 239/265.11–265.43; 244/110 B
See application file for complete search history.

(56) References Cited

U.S. PATENT DOCUMENTS

| | | | | |
|---|---|---|---|---|
| 4,043,119 | A * | 8/1977 | Faulkner | 60/788 |
| 4,979,362 | A | 12/1990 | Vershure, Jr. | |
| 6,094,908 | A * | 8/2000 | Baudu et al. | 60/226.2 |
| 6,142,418 | A * | 11/2000 | Weber et al. | 244/58 |
| 6,681,559 | B2 * | 1/2004 | Johnson | 60/204 |
| 6,732,529 | B2 * | 5/2004 | Anderson | 60/772 |
| 6,786,315 | B1 * | 9/2004 | Christensen | 192/48.7 |
| 6,810,656 | B2 * | 11/2004 | Kortum et al. | 60/226.2 |

(Continued)

FOREIGN PATENT DOCUMENTS

| | | |
|---|---|---|
| EP | 1 588 882 | 10/2005 |
| WO | 2006 134253 | 12/2006 |

*Primary Examiner* — Phutthiwat Wongwian
*Assistant Examiner* — Steven Sutherland
(74) *Attorney, Agent, or Firm* — Oblon, Spivak, McClelland, Maier & Neustadt, L.L.P.

(57) ABSTRACT

A control system for controlling a plurality of distinct functions of a turbojet engine, each function being associated with a respective actuation device. The system includes: an electric motor adapted to supply mechanical energy to each of the actuation devices; an electronic control unit for the electric motor; and at least one switching device interposed between the motor and the actuation devices, the switching device(s) serving to distribute the mechanical energy supplied by the electric motor selectively to one of the actuation devices.

10 Claims, 3 Drawing Sheets

(56) References Cited

U.S. PATENT DOCUMENTS

| | | | |
|---|---|---|---|
| 7,093,424 B2 * | 8/2006 | Hanlon et al. | 60/226.2 |
| 7,481,062 B2 * | 1/2009 | Gaines et al. | 60/792 |
| 2004/0188211 A1 * | 9/2004 | Christensen | 192/3.51 |
| 2006/0260323 A1 * | 11/2006 | Moulebhar | 60/793 |
| 2009/0065634 A1 | 3/2009 | Marin Martinod | |

\* cited by examiner

SYSTEM FOR CONTROLLING A PLURALITY OF FUNCTIONS OF A TURBOJET ENGINE

BACKGROUND OF THE INVENTION

The invention relates to powering and controlling electromechanical equipment of an aircraft engine and/or its surroundings. The invention applies more particularly to airplane engines and specifically to gas turbine engines of the turbojet type.

The term "electromechanical equipment of an aircraft engine or of its surroundings" is used herein to cover not only equipment that is useful for the actual operation of the engine, but also equipment that is associated with the engine nacelle. By way of example, such equipment may comprise electromechanical devices for actuating various functions of the engine while the engine is in operation or while it is stopped, such as, in particular, devices for actuating thrust reversers for a gas turbine airplane engine or devices for actuating maintenance covers (opening/closing the covers).

Each electromechanical actuation device as mentioned above generally comprises at least one actuator, an electric motor for actuating the actuator, and controlling electronics for controlling the electric motor and dimensioned as a function of the specific requirements of the actuation device.

Furthermore, the present trend is to control more and more functions of an aircraft engine by means of such electromechanical actuation devices.

Consequently, there exists a need to simplify the powering and the control of such actuation devices in order to reduce manufacturing costs and also in order to reduce design complexity, in particular in terms of overall bulk, weight, and dimensioning.

OBJECT AND SUMMARY OF THE INVENTION

To this end, the present invention proposes a control system for controlling a plurality of distinct functions of a turbojet engine, each function being associated with a respective actuation device, said system comprising:

an electric motor adapted to supply mechanical energy to each of the actuation devices;

an electronic control unit for the electric motor; and at least one switching device interposed between the motor and the actuation devices, the switching device(s) serving to distribute the mechanical energy supplied by the electric motor selectively to one of the actuation devices.

The invention thus makes it possible to share controlling electronics and electric motors between a plurality of electromechanical actuation devices that are associated with respective distinct functions of the turbojet engine that are not to be operated simultaneously. The term "sharing" is used herein to mean that the same control electronics and the same electric motor are used for all of the electromechanical actuation devices.

In the example of functions that comprise a thrust reverser and a maintenance cover, the invention makes it possible to have a common control system for use selectively to actuate the thrust reverser while braking the aircraft, and to open the maintenance cover.

In addition, the invention advantageously makes it possible to take advantage of controlling electronics and an electric motor that are entirely compatible with each other and that are dimensioned to drive a so-called "main" function that consumes a large amount of power, but over a duration that is nevertheless limited (such as a thrust reverser), and that are also suitable for actuating one or more so-called "secondary" functions that require less power in order to be actuated (such as a maintenance cover).

The sharing of the controlling electronics and the electric motors that the invention makes possible thus leads to a reduction in terms of cost and weight, and also in terms of bulk and complexity of design. In accordance with the invention, a single electric motor and a single electronic control unit suffice to control a plurality of functions, thereby limiting requirements for an electrical power transmission harness.

Furthermore, provision can be made for a main function of the turbojet engine to have control electronics and an electric motor that are duplicated, thus enabling secondary functions to benefit from such redundancy, even though they would not normally do so.

In a particular embodiment of the invention, in which each switching device has an inlet suitable for receiving the mechanical energy supplied by the motor and two outlets, the switching device is suitable for switching the mechanical energy it receives at its inlet to one or the other of the outlets.

In a first variant embodiment in which the control system of the invention has a single switching device, each outlet from the switching device is connected to a respective actuation device.

In this first variant, the control system of the invention enables no more than two functions to be controlled.

In a second variant embodiment, in which the control system includes at least two switching devices, one of the outlets of one of the switching devices is connected to the inlet of another switching device.

In this second variant embodiment, it is possible for the controlling electronics and the motors to be shared amongst at least three functions.

In a particular embodiment of the invention, at least one of the switching devices is suitable for switching the mechanical energy it receives at its inlet to one of its outlets on receiving an electric command signal and to the other outlet in the absence of an electric command signal.

In particular, in the absence of a signal, the switching device may be adapted to switch mechanical energy to the actuation device that is associated with a main function. As a result, control of the main function takes priority, by default.

In another particular embodiment of the invention, at least one of the switching devices is suitable for switching the mechanical energy it receives at its inlet to one or the other of its outlets as a function of a received mechanical command.

Advantageously, the electronic control unit of the system of the invention is suitable for adapting the electrical power delivered to like motor depending on the function that is to be controlled.

As a result, the mechanical energy supplied by the motor to the actuation device selected by the switching device complies with the requirements of the function associated with said actuation device.

The system of the invention may also include means for informing the electronic control unit of the motor about which actuation device is having energy distributed thereto.

This information may serve in particular to enable the electronic control unit to dimension the power for delivering to the motor depending on the function being controlled, in particular when the switching device is controlled by a mechanical command.

This information may also constitute means for verifying that the mechanical energy is being switched properly to the appropriate actuation device, thereby enhancing the safety of the system.

BRIEF DESCRIPTION OF THE DRAWINGS

Other characteristics and advantages of the present invention appear from the following description made with reference to the accompanying drawings that show embodiments having no limiting character. In the figures.

DETAILED DESCRIPTION OF TWO EMBODIMENTS OF THE INVENTION

Figure 1:
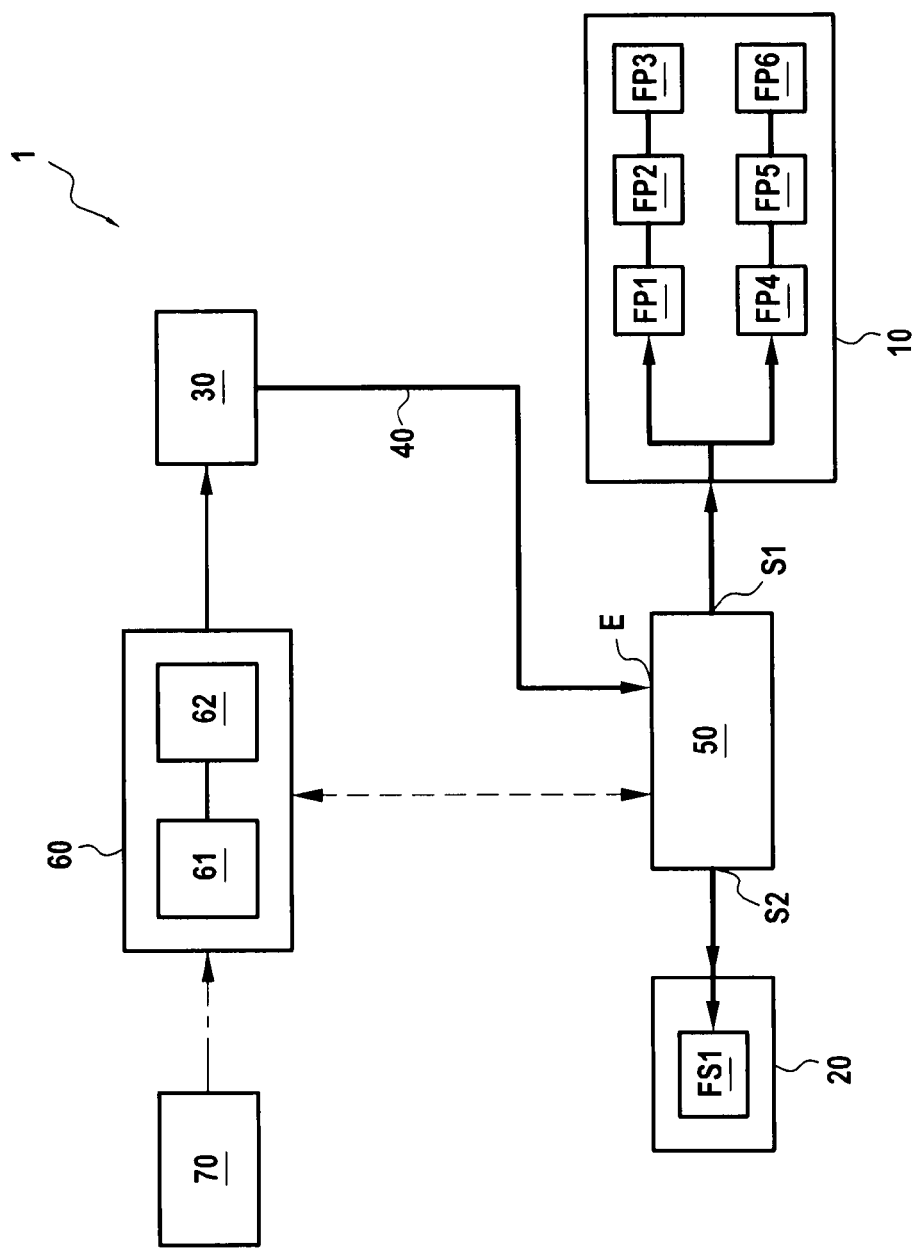
FIG. 1 shows a control system in accordance with the invention in its environment, in a first embodiment in which the system enables two functions of a turbojet engine to be controlled.

FIG. 1 shows a control system 1 in accordance with the invention in a first embodiment. In this first embodiment, two distinct functions of a turbojet are to be controlled, specifically in this example: a thrust reverser (a "main" function); and a maintenance hatch or cover (a "secondary" function) of the turbojet.

Nevertheless, the invention may be applied equally well to some number of functions that is greater than two (as described below for the second embodiment of the invention) and to other types of function, provided they are not of the kind that are intended to be actuated simultaneously.

Each function is associated with an electromechanical actuation device that may comprise one or more actuators. Thus, the thrust reverser is associated with an electromechanical actuation device 10 comprising six actuators FP1, ..., FP6 that are connected via flexible transmission shafts (three actuators per thrust reverser door in the example described here). An example of such an electromechanically actuated thrust reverser is described in particular in document EP 0 843 089. Similarly, a maintenance cover is associated with an electromechanical actuation device 20 having a single actuator FS1.

The control system 1 includes an electric motor 30 suitable for delivering mechanical energy to one or other of the actuation devices 10 and 20 for the thrust reverser and for the maintenance cover.

For this purpose, the mechanical energy delivered by the motor 30 is transmitted via a mechanical transmission shaft 40 to a switching device 50 interposed between the motor 30 and the actuation devices 10 and 20. The mechanical energy is then distributed selectively by the switching device 50 to one or the other of the actuation devices, depending on the function that is to be actuated.

The control system 1 also includes an electronic control unit 60 for the electric motor 30. This electronic control unit 60 is adapted to control the electric motor 30 depending on the function that is to be controlled.

It comprises in particular a power module 61 (also referred to as power electronics) that is adapted to generate electrical power for powering the electric motor 30. It also includes control means 62 for controlling the power generated by the power module 61 so as to adapt the electrical power delivered to the motor 30 depending on the function that is to be controlled.

When the control system 1 is designed, the power capacity of the module 61 is advantageously dimensioned relative to the function that requires the highest power in order to be actuated (the main function), i.e. in this example the thrust reverser. As a result, the power module 61 is also suitable for delivering sufficient electrical power to be able to actuate the function that requires less power in order to be actuated (the secondary function), i.e. in this example the maintenance cover.

Consequently, the power capacity of the module 61 is overdimensioned relative to the secondary function. In order to avoid damaging the secondary function, the control means 62 enable the electrical power delivered to the motor to be adapted depending on the function that is to be controlled, by regulating the voltage and the current of the electricity fed to the motor 30.

The power supply voltage and electricity to be fed to the motor 30 may be determined in particular on the basis of voltage and current measurements that are pre-established for each function that is to be controlled. The electric motor 30 may also include a sensor (not shown in the figure) that informs the electronic control unit 60 of the torque actually being applied by the electric motor 30 in order to enable the electrical power delivered to the motor 30 to be regulated accurately.

In order to identify which function is to be controlled and to apply the appropriate voltage and current, the electronic control unit 60 may make use of information received from the full authority digital engine control (FADEC) device 70. Such information is received in the form of digital commands, e.g. comprising operating parameters of the turbojet engine that enable the electronic control unit 60 to identify the function to be controlled, or in a variant actually identifying the function to be controlled.

Thus, in accordance with the invention, a single electronic control unit 60 and a single electric motor 30 are used for actuating two respective actuation devices 10 and 20 for the thrust reverser and for the maintenance cover. Since these two functions are not designed to be operated simultaneously, the switching device 50 needs to deliver the energy supplied by the electric motor 30 selectively to one or other of the actuation devices associated with these functions.

For this purpose, consideration is given to a switching device 50 that has an inlet E suitable for receiving the mechanical energy delivered by the electric motor 30 via the transmission shaft 40, and two outlets S1 and S2 that are connected respectively to the actuation devices 10 and 20.

In the example described, in order to switch the energy received at its inlet to one or the other of the two outlets, the switching device 50 makes use of a clutch-type mechanism. In known manner, a clutch mechanism serves to unite two parts (e.g. two transmission shafts) so as to communicate to one of them the rotary movement from the other. Thus, such a mechanism makes it possible either to couple the inlet E with the outlet S1, or to couple the inlet E with the outlet S2.

Figure 2A:
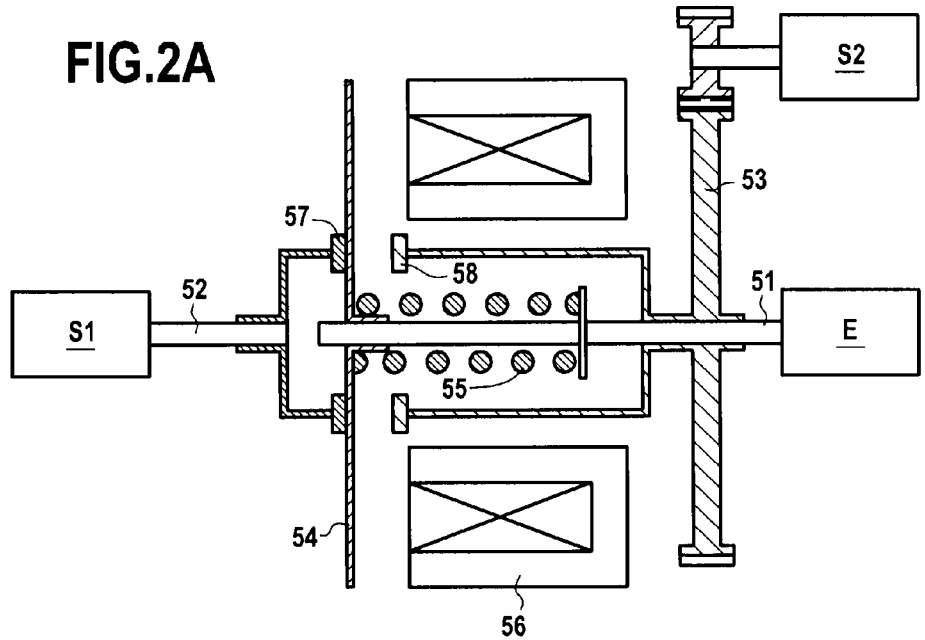
FIGS. 2A and 2B show an example of the operation of a switching device suitable for use in the control system shown in FIG. 1.
Figure 2B:
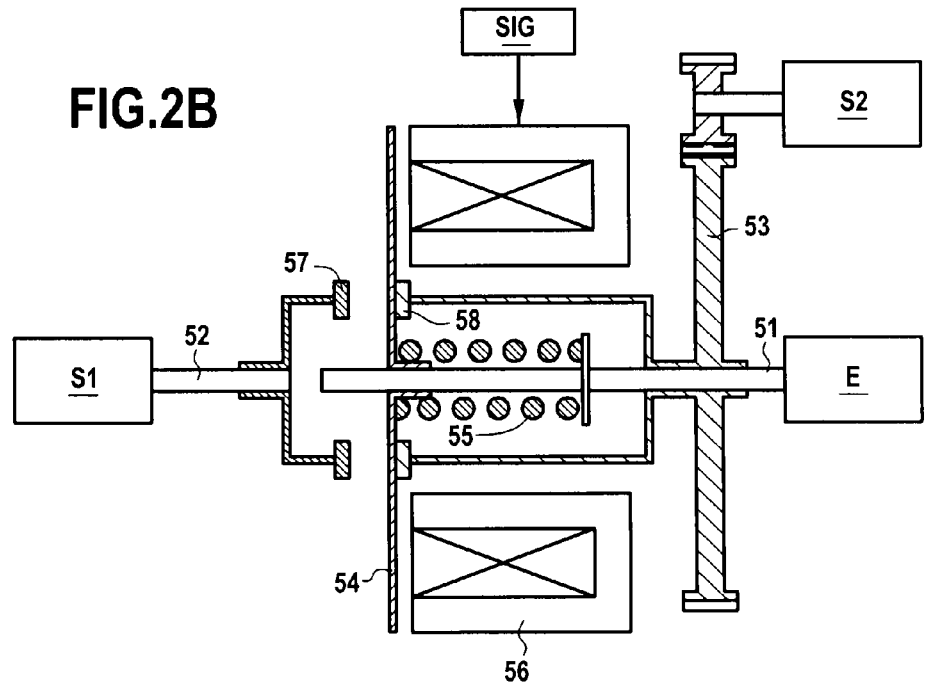

An example of a switching device 50 that implements such a mechanism is shown in FIGS. 2A and 2B.

The switching device 50 shown in these figures switches the mechanical energy it receives at its inlet E towards one or the other of the outlets S1 and S2 as a function of whether or not it has received an electric command signal. This command signal may come for example from the FADEC 70 of the airplane or from the electronic control unit 60.

In known manner, in order to perform such an operation, the switching device 50 comprises:
an inlet shaft 51 coupled to the inlet E:
a first outlet shaft 52 coupled to the outlet S1;
a second outlet shaft 53 coupled to the outlet S2;

a metal plate 54 constrained to rotate with the inlet shaft 51 and that is movable in translation;

a return spring 55 connected at one end to the inlet shaft 51 and at the other end to the metal plate 54; and an electromagnet 56 having a solenoid within which a core may be placed.

In preferred manner, when the switching device 50 does not receive an electric command signal, it delivers the mechanical energy it receives from the electric motor 30 to the actuation device 10 that is associated with the main function (S1), i.e. in this example the thrust reverser. Conversely, when the switching device 50 receives an electric command signal SIG, it delivers the mechanical energy supplied by the electric motor 30 to the actuation device 20 associated with the secondary function (S2), i.e. in this example the maintenance cover. In this way, powering and controlling the main function takes priority by default.

For this purpose, the return spring 55 has a rest length such that when the solenoid of the electromagnet 56 is not electrically powered (i.e. when the switching device 50 is not receiving the electric command signal), it serves to press the metal plate 54 against a friction disk 57. The disk 57 is constrained to rotate with the first outlet shaft 52 (cf. FIG. 2A). Thus, when the metal plate 54 is set into rotation by the electric motor 30 (via the inlet shaft 51), it transmits this rotary movement by friction to the first outlet shaft 52 via the disk 57. The mechanical energy delivered by the electric motor 30 to the inlet E is thus transmitted by friction to the outlet S1 (only) of the switching device 50 so as to be delivered to the actuation device 10 of the thrust reverser. The actuation device 10 then distributes the mechanical energy it receives to the various actuators FP1, . . . , FP6, thereby enabling the thrust reverser to be actuated. This distribution is performed by means of flexible transmission shafts, in a manner known to the person skilled in the art and not described in detail herein.

When the solenoid of the electromagnet 56 is powered (cf. FIG. 2B), by an electric command signal SIG, it attracts the metal plate 54 towards it. The plate is then pressed against a friction disk 58. The disk 58 is constrained to rotate with the second outlet shaft 53. Thus, when the metal plate 54 is set into rotation by the electric motor 30 (via the inlet shaft 51), it transmits this rotary movement by friction to the second outlet shaft 53 via the disk 58. The mechanical energy delivered by the electric motor 30 to the inlet E is thus transmitted by friction to the outlet S2 (only) of the switching device 50, so as to be delivered to the actuation device 20 of the maintenance cover. The actuation device 20 then transmits the mechanical energy it receives to the actuator FS1 via a flexible transmission shaft, thereby causing the maintenance cover to open, for example.

In the example described herein, the switching device 50 makes use of a friction clutch mechanism. Nevertheless, other clutch mechanisms could naturally be considered, such as for example a jaw clutch mechanism, etc.

In another embodiment (not shown in the figures), the switching device 50 switches the mechanical energy delivered by the electric motor 30 and received at the inlet E to one or the other of the outlets S1 and S2 as a function of a command that is mechanical.

By way of example, this mechanical command may come from a lever that, when in a position A, serves to secure the inlet shaft in rotation with the first outlet shaft (thereby coupling the inlet E with the outlet S1), and when in a position B to secure the inlet shaft in rotation with the second outlet shaft (and thus to couple the inlet E with the outlet S2).

In a manner similar to the electric command signal, a default position may be envisaged for the lever, so that the switching device acts by default to deliver mechanical energy to the actuation device of the thrust reverser. Changing the position of the lever (e.g. manually) to the other position then enables mechanical energy to be distributed to the actuation device of the maintenance cover. Closure of the maintenance cover may be arranged to cause the lever to return to its position by default.

According to an advantageous characteristic, a position return sensor (not shown in FIG. 1), e.g. located on the switching device 50, serves to inform the FADEC 70 of the airplane or the electronic control unit 60 about which actuation device is arranged to have mechanical energy distributed thereto (i.e. which function is activated).

This makes it possible in particular to verify that the switching device 50 delivers mechanical energy to the appropriate actuation device.

Furthermore, when the switching device 50 is controlled by a mechanical command to select the actuation device that is to receive mechanical energy and this command does not reach the switching device or is not known to the switching device, then this information may enable the unit 60 to adapt the power delivered to the motor 30 depending on the function associated with the actuation device that is selected.

Figure 3:
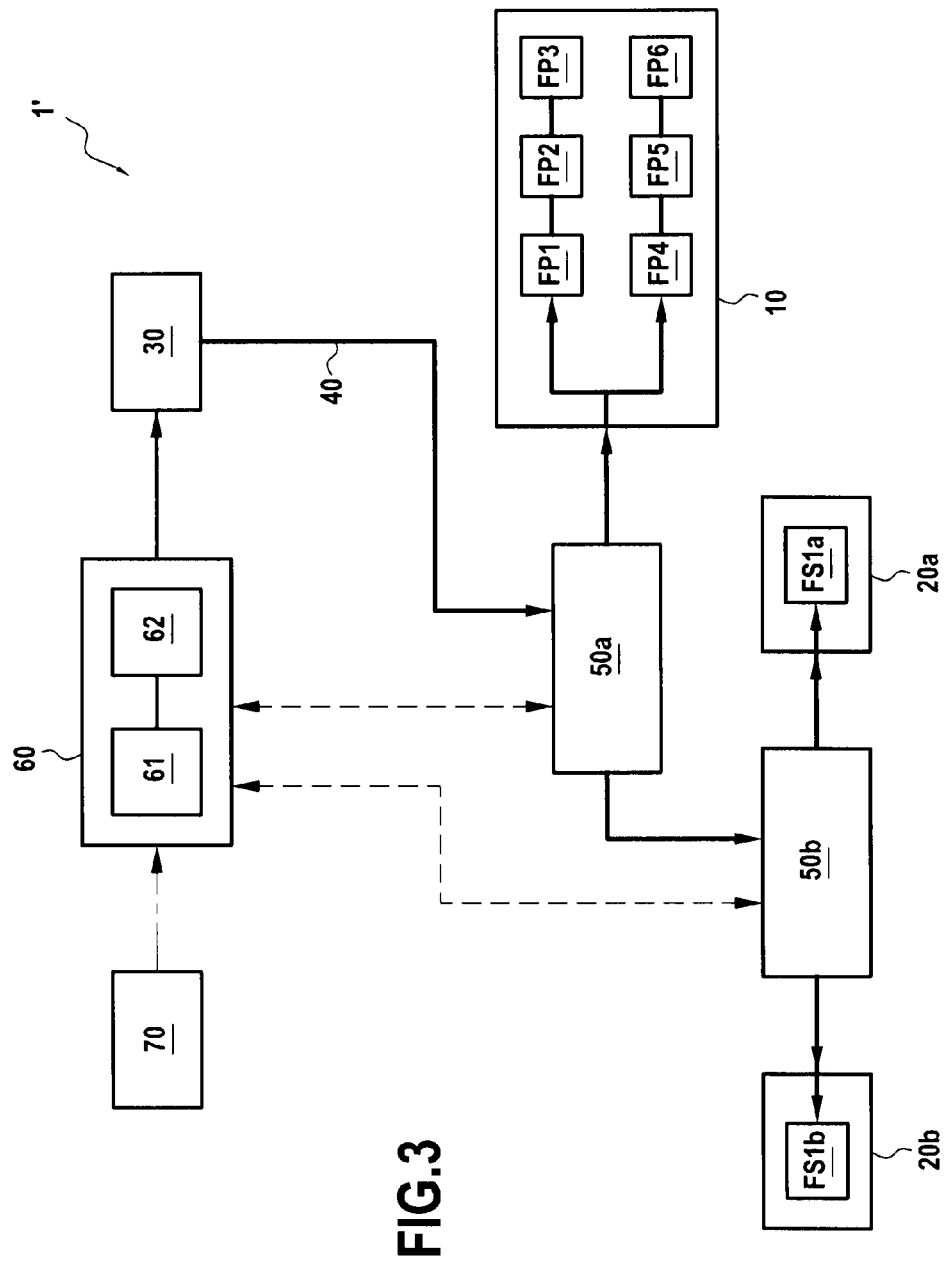
FIG. 3 shows a control system in accordance with the invention in its environment, in a second embodiment in which the system serves to control three functions of a turbojet engine.

As mentioned above, the invention also applies to controlling more than two functions of a turbojet engine. Thus, there follows a description with reference to FIG. 3 of a second embodiment of the invention in which three distinct functions of a turbojet engine are to be powered, none of which functions are to operate simultaneously. In this example, these functions are a thrust reverser (main function), and two maintenance covers, e.g. an engine cover and a fan cover (secondary functions).

Each function is associated with a respective actuation device. Thus, the thrust reverser is associated with the actuation device 10, and the two maintenance covers are associated respectively with actuation devices 20a and 20b.

The control system 1' of the invention comprises an electric motor 30, an electronic control unit 60, and a FADEC 70, similar to those described above for the first embodiment.

The control system 1' also includes first and second switching devices 50a and 50b interposed between the motor 30 and the actuation devices 10, 20a, and 20b. The switching devices 50a and 50b are similar to the switching device 50 described for the first embodiment.

Thus, the first switching device 50a includes an inlet connected to the electric motor 30 via the transmission shaft 40, and also to two outlets that are connected respectively to the actuation device 10 and to the inlet of the second switching device 50b. The first switching device 50a is thus adapted to deliver the mechanical energy it receives from the electric motor 30 to the actuation device 10 or to the second switching device 50b (i.e. towards the actuation device 20a or the actuation device 20b), e.g. as a function of an electric command signal or a mechanical command signal as described for the first embodiment of the invention.

The second switching device 50b has an inlet connected to one of the outlets of the first switching device 50a and two outlets that are connected respectively to the actuation device 20a and to the actuation device 20b. The second switching device 50b is thus adapted to deliver the mechanical energy it receives from the electric motor 30 (via the switching device 50a) to the actuation device 20a or to the actuation device 20b, e.g. as a function of an electric command signal or of a mechanical command signal, as described for the first embodiment of the invention.

The invention claimed is:

1. A control system for controlling a plurality of distinct functions of a turbojet engine that are not to be operated simultaneously, each function being associated with a respective actuation device, the system comprising:
   an electric motor adapted to supply mechanical energy to each of the actuation devices;
   at least one switching device interposed between the motor and the actuation devices; and
   an electronic control unit for the at least one switching device and the electric motor
   wherein the electronic control unit controls the at least one switching device to selectively distribute the mechanical energy supplied by the electric motor to one of the actuation devices based on the function to be operated by the one of the actuation devices, and controls the at least one switching device such that the other actuation devices that are not operated simultaneously with the one of the operating devices are not supplied in mechanical energy by the electric motor.

2. A system according to claim 1, wherein the at least one switching device includes an inlet configured to receive the mechanical energy supplied by the electric motor and first and second outlets, the switching device being configured to switch the mechanical energy received at the inlet to one of the outlets preventing the mechanical energy to be supplied simultaneously at two actuation devices.

3. A system according to claim 2, wherein the system includes a single switching device, each outlet of the switching device being connected to a respective actuation device.

4. A system according to claim 2, wherein the system includes first and second switching devices, one of the outlets of the first switching device being connected to the inlet of the second switching device.

5. A system according to claim 2, wherein at least one of the switching devices is configured to switch the mechanical energy received at the inlet thereof to the first outlet thereof on receiving an electric command signal and to the second outlet thereof in absence of an electric command signal.

6. A system according to claim 2, wherein at least one of the switching devices is configured to switch the mechanical energy received at the inlet thereof to one of the outlets thereof as a function of a received mechanical command.

7. A system according to claim 2, wherein the at least one switching device comprises:
   an inlet shaft coupled to the inlet;
   a first outlet shaft coupled to the first outlet;
   a first friction disk coupled to the first outlet shaft;
   a second outlet shaft coupled to the second outlet;
   a second friction disk coupled to the second outlet shaft;
   a metal plate rotatable with the inlet shaft and movable in translation;
   a return spring connected at a first end to the inlet shaft and at a second end to the metal plate; and
   an electromagnet,
   wherein, when the electromagnet is not powered, the plate presses against the first friction disk such that the first outlet shaft rotates with the inlet shaft, and, when the electromagnet is powered, the plate presses against the second friction disk such that the second outlet shaft rotates with the inlet shaft.

8. A system according to claim 1, wherein the electronic control unit is configured to adapt the electrical power delivered to the motor depending on the function that is to be controlled.

9. A system according to claim 1, further comprising means for informing the electronic control unit of the motor about which actuation device is having energy distributed thereto.

10. A system according to claim 1, wherein the functions controlled by the system comprise:
   a thrust reverser; and
   a maintenance cover.

* * * * *